No. 685,128. Patented Oct. 22, 1901.
L. GENTY.
PROCESS OF MANUFACTURING GAS.
(Application filed Apr. 29, 1901.)
(No Model.)
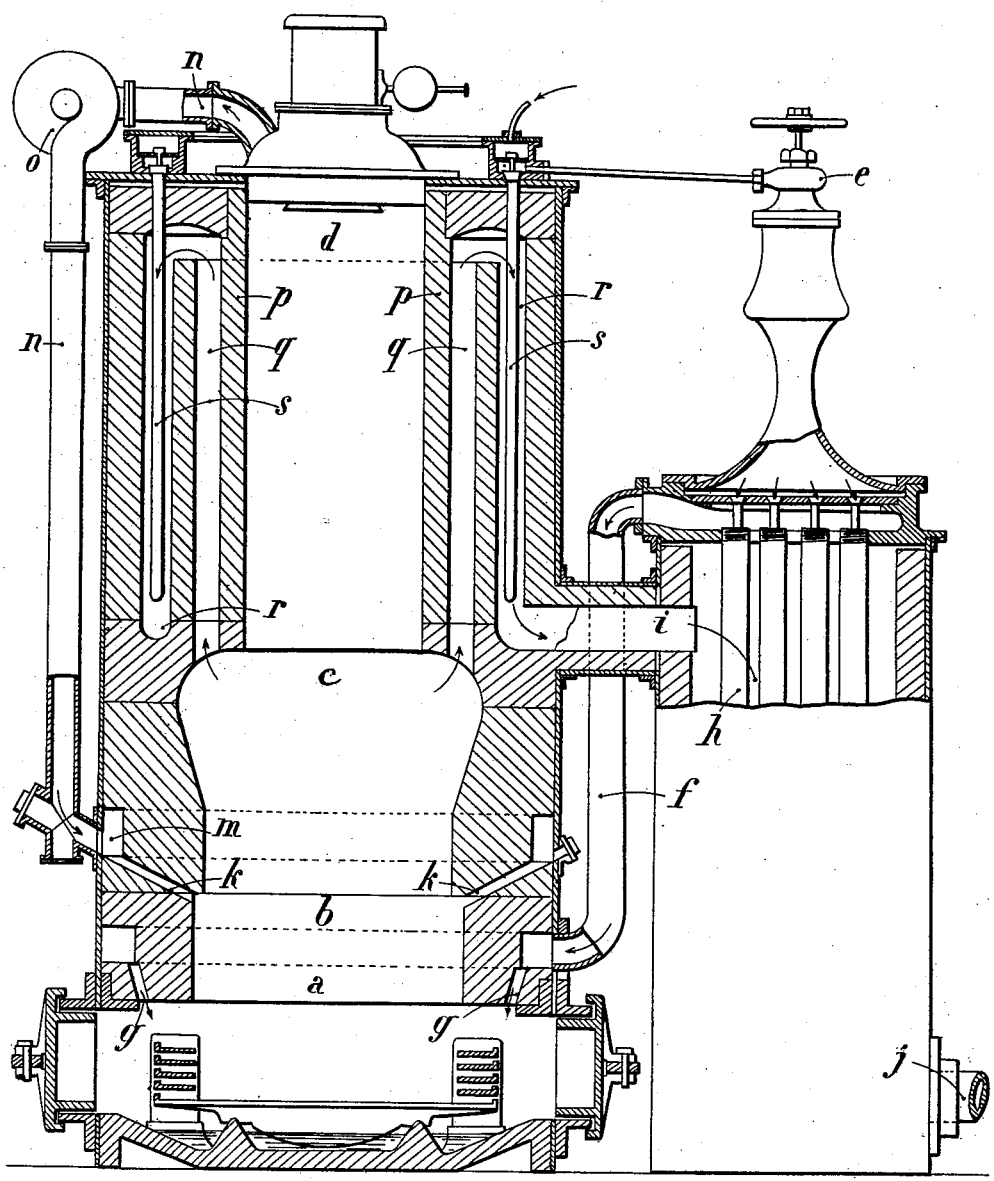
Witnesses
Inventor
Lucien Genty
By James L. Norris
Atty

UNITED STATES PATENT OFFICE.

LUCIEN GENTY, OF MARSEILLES, FRANCE, ASSIGNOR TO LUCIEN GENTY, OF MARSEILLES, FRANCE, AND LA SOCIÉTÉ GÉNÉRALE DES INDUSTRIES ÉCONOMIQUES, MOTEUR CHARON, OF PARIS, FRANCE.

PROCESS OF MANUFACTURING GAS.

SPECIFICATION forming part of Letters Patent No. 685,128, dated October 22, 1901.

Application filed April 29, 1901. Serial No. 58,055. (No specimens.)

*To all whom it may concern:*

Be it known that I, LUCIEN GENTY, engineer, a citizen of the French Republic, residing at Marseilles, Bouches-du-Rhône, France, (and having post-office address 61 Rue St. Jacques, in the said city of Marseilles,) have invented certain new and useful Improvements in the Direct Manufacture of Poor Gas from Bituminous Coal in Gazogenes, of which the following is a specification.

This invention has for its object improvements in the manufacture of gas by means of which bituminous coal can be employed for the production of gas intended to be supplied to gas engines or motors.

Gas-engines supplied with poor gases generally work in a satisfactory manner only when coupled with gazogenes furnished with anthracite or coke—in other words, with fuel containing but slight quantities of volatile substances. When soft coal or brown coal (lignite) is used, great quantities of tar are distilled, the effect of which is to obstruct the conduits, stick the valves, and finally stop the motor.

According to my invention the gas, free from tar or other condensable substances, can be produced in a gazogene directly from bituminous coal.

In the working of a gazogene from the bottom to the top a first "zone of combustion" is seen near the grate of the furnace, from which a mixture of carbon dioxid, ($CO_2$,) carbon monoxid, (CO,) and nitrogen is set free. Generally a quantity of steam is added to this mixture. Above this zone of combustion is a "neutral zone," wherein no chemical reaction occurs, and immediately above this latter is a "zone of reduction," in which utilizable gases, hydrogen, and carbonic monoxid, are formed as a consequence of the well-known action of hot coal on carbon dioxid ($CO_2$) and steam. Above this zone of reduction no further chemical actions occur, and the hot gases which flow through the column of fuel heat this column and in the upper part of the same distil the volatile substances therefrom. This part of the column will in the following be termed the "distillation zone." The gaseous mixture generated in the reduction zone contains no condensable substance; but on passing through the zone of distillation the mixture becomes charged with tar vapors, hydrocarbons, and steam.

According to the present methods of generating gas and supplying gas-engines therewith the gas, charged with impurities, as explained, is fed to the motor, the consequence of which is the above-named inconveniences.

According to my invention the gas intended for the supply of the motors is extracted from the generator at a height corresponding to the separation of the reduction and distillation zones—that is to say, in a part of the apparatus where the gas is not again charged with condensable substances. The gas which is not extracted from this special part of the gazogene continues to ascend and flows through the zone of distillation, from which it withdraws all the volatile substances contained in the fuel. A fan or other suitable blast apparatus extracts the gas charged with the volatile substances and vapors from the top of the generator and conducts the same into the lower part of the said generator at a height corresponding to the neutral zone, where it mixes with the products of combustion and flows therewith through the zone of reduction. The effect of the high temperature in the neutral zone is to decompose the tar into very volatile and non-condensable hydrocarbons, which are drawn off by the gaseous ascending current, and into carbon, which is deposited on the coal and descends with the latter toward the combustion zone, where it is burned. The steam which is set free from the fuel and also the steam fed in with the air introduced for the production of the poor gas are also decomposed by their contact with the red-hot coal, thus producing hydrogen and carbonic monoxid. It will be readily understood that by this process the products of distillation instead of stuffing the gas-conduits are used for improving the finally-produced gas.

In working this process I may use a gas-generator constructed as shown in longitudinal section by the accompanying drawing; but I do not limit myself to this peculiar form of apparatus.

$a$ indicates the location of the combustion-zone, $b$ that of the neutral zone, and $c$ and $d$ the locations of the reduction and distillation zones, respectively, arranged in succession from the bottom to the top of the apparatus, as hereinbefore described. Air for the combustion of the fuel placed on the grate is forced into the furnace by means of a fan or other suitable air or steam blast (if steam is to be injected) through a pipe $f$ and a series of twyers $g$, arranged circumferentially to this furnace. This air may be heated on its way to the pipe $f$ by passing through a reheater $h$ of any convenient construction, which is traversed by the hot producer-gas on its way from the outlet $i$ of the gazogene to the pipe $j$. The products of combustion ascend toward the neutral zone $b$, where they are mixed with the gas charged with tar, entering the said zone by a series of twyers $k$, leading from a circular channel $m$, connected to a pipe $n$, the other end of which is fitted to the top of gazogene, as shown. This gaseous mixture then enters the reduction zone $c$, the diameter of which decreases, so as to reduce the speed of the gaseous current and permit the reactions to be completed. A fan or suitable means $o$ is arranged in the pipe $n$ for the purpose of extracting the gas and tarry vapors from the upper part of the apparatus and forcing them down toward the twyers $k$. Above this reduction zone the transverse area of the gazogene is suddenly reduced by the presence of a cylinder $p$, of refractory material, leaving between its external wall and the internal shell of the gazogene an annular space $q$. A portion of the poor producer-gas of the reduction zone $c$ will pass into and up this space $q$, from which it descends through a second annular space $r$ toward the outlet-pipe $i$, leading to the reheater $h$ and to the conduit $j$, from which it flows to the cleaning, washing, drying, and service apparatus. The gas which does not flow through the annular space $q$ ascends in the cylinder $p$ and comes in the distillation zone $d$, wherein it becomes charged with all the volatile substances, tar, and other products contained in the fuel, the column of fuel being heated by the hot producer-gas which passes in the outer annular spaces $q$ and $r$. A series of tubes $s$ may be arranged in the space $r$ for the purpose of superheating the steam which supplies the steam-blast $e$.

Having now particularly described and ascertained the nature of my said invention and in what manner the same is to be performed, I declare that what I claim is—

An improved process for the direct manufacture of poor gas from bituminous coal in gazogenes, which process consists in extracting a portion of the producer-gas, between the reduction and distillation zones and passing it upward around the body of coals to heat the same, causing the remaining body of gas to flow through the said distillation zone and withdrawing it therefrom at the top of the gazogene and returning it together with all the tar and condensable substances into the gazogene between the zone of combustion and the zone of reduction for the purpose of decomposing the tar into hydrocarbons and carbon and thus providing an addition of combustible substances and thereby improving the final product, substantially as set forth.

In testimony whereof I have hereunto set my hand in presence of two subscribing witnesses.

LUCIEN GENTY.

Witnesses:
ALLAN MACFARLANE,
ROBERT K. FAST.